VARIABLE EQUALIZER

Filed March 18, 1968 6 Sheets-Sheet 1

Dec. 29, 1970 KOICHI ENDO ET AL 3,551,854

VARIABLE EQUALIZER

Filed March 18, 1968 6 Sheets-Sheet 2

United States Patent Office 3,551,854

Patented Dec. 29, 1970

3,551,854

VARIABLE EQUALIZER

Koichi Endo, Tokyo, Kiyoto Aizawa, Yokohama-shi, Takamoto Kojima and Hirosuke Tanaka, Kawasaki-shi, and Koichi Watanabe, Yokohama-shi, Japan, assignors to Fujitsu Limited, Kawasaki, Japan, a corporation of Japan Filed Mar. 18, 1968, Ser. No. 713,859
Claims priority, application Japan, Mar. 16, 1967, 42/16,811; Apr. 5, 1967, 42/21,628; Apr. 18, 1967, 42/24,987; Dec. 23, 1967, 42/82,780
Int. Cl. H03h *7/14;* H04b *3/04*
U.S. Cl. 333—28 7 Claims

ABSTRACT OF THE DISCLOSURE

A plurality of two-part networks are connected in a loop between an input port and an output port. The loop has a transfer coefficient which determines the variable frequency characteristic of the variable equalizer and the transfer coefficient has a real coefficient which determines the proportional variation of the magnitude of transmission of an electrical signal from the input to the output port.

DESCRIPTION OF THE INVENTION

Our invention relates to a variable equalizer.

The principal object of our invention is to provide a new and improved variable equalizer.

An object of our invention is to provide a variable equalizer which is of simple structure and which is economical in manufacture.

An object of our invention is to provide a variable equalizer which functions with efficiency, effectiveness and reliability, and with high precision.

In accordance with the present invention, a variable equalizer comprises an input port and an output port. A port is a pair of terminals. A plurality of two-port networks are connected in a loop between the input and output ports. The loop has a transfer coefficient which determines the variable frequency characteristics of the variable equalizer and the transfer coefficient has a real coefficient which determines the proportional variation of the magnitude of transmission of an electrical signal from the input port to the output port.

In a first embodiment, a first of the networks has a transfer coefficient $x$ and is connected between the input and output ports. A second of the networks has a transfer coefficient $z_1$. A third of the networks has a transfer coefficient $z_2$. A fourth of the networks has a transfer coefficient $\alpha k$. The second, third and fourth networks are connected in series circuit with each other and the series circuit is connected in parallel with the first network. A fifth of the networks has a transfer coefficient $y$ and is connected in parallel with the fourth network and $z_1 z_2 = 2xy$. The fourth network determines the frequency characteristic of the variable equalizer.

In another embodiment, each of a plurality of the networks comprises a hybrid transformer. A separating network is connected between adajacent ones of the hybrid transformers in the loop. The separating network has a nearly constant resistance in a determined bandwidth.

In another embodiment, each of two of the networks comprises a hybrid transformer and each of a first, second and third of the networks is connected between the hybrid transformers. One of the hybrid transformers is connected to the input port and the other of the hybrid transformers is connected to the output port. One of the first, second and third networks has a transfer coefficient which determines the proportional variation of the magnitude and phase of transmission of the electrical signal and the proportional variation is varied in accordance with the variation of one of gain and loss in transmission between the input and output ports.

In still another embodiment, a first of the networks has a transfer coefficient of the frequency characteristic. A second of the networks has an arbitrarily variable transfer coefficient. A third of the networks has a unilateral transfer coefficient and none of the plurality of networks comprises a hybrid transformer. The variable equalizer provides between the output and input ports a pure resistance $$R = \frac{\sqrt{(R_a + R_b)^2 + 4R_aR_b} - (R_a + R_b)}{2}$$

wherein $$R_a = \frac{R_1 R_{in}}{R_1 + R_{in}} \text{ and } R_b = \frac{R_2 R_{out}}{R_2 + R_{out}}$$

and $R_{in}$ is the input impedance, $R_{out}$ is the output impedance, $R_1$ is the power source impedance connected to said input port and $R_2$ is the load impedance at said output port. The magnitude of transmission is variable to a constant specific frequency in accordance with variation of the magnitude of the transfer coefficient of the variable equalizer.

In order that the present invention may be readily carried into effect, it will now be described with reference to the accompanying drawings, wherein.

Figure 6:
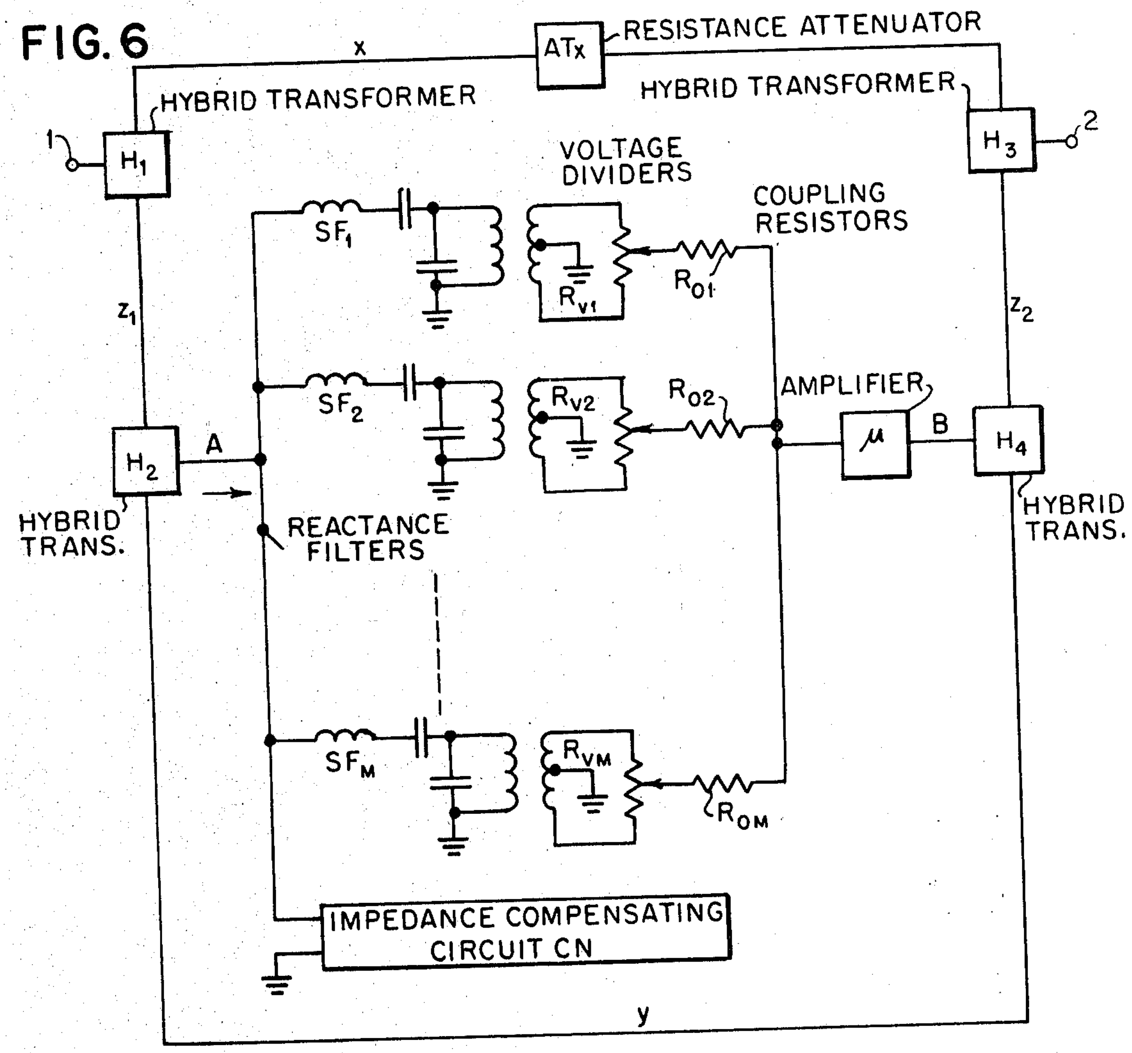
FIG. 6 is a block and circuit diagram of another embodiment of the variable equalizer of the present invention which functions as a composite variable equalizer.
Figures 8A, 8B:
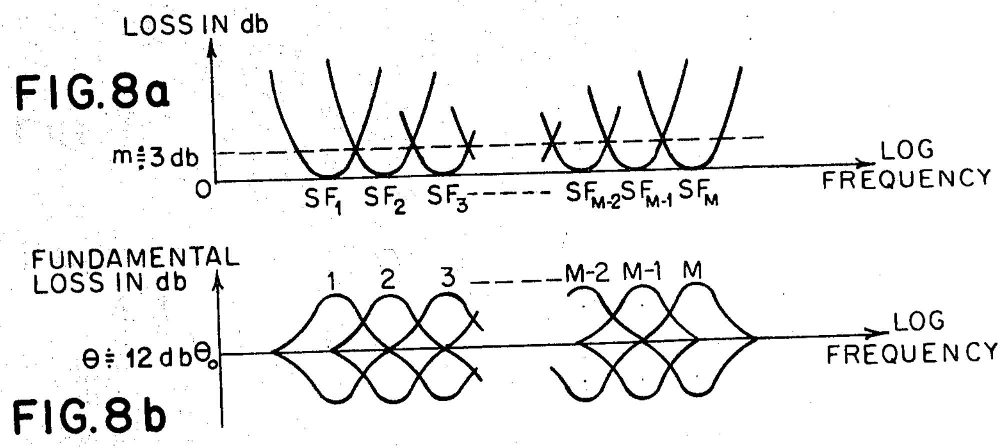
Figure 9:
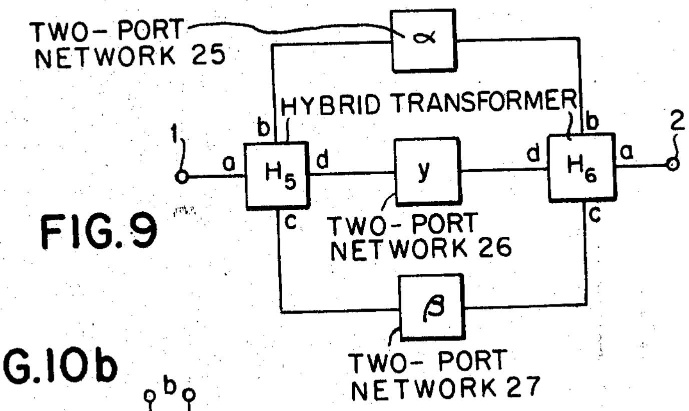
Figure 10A:
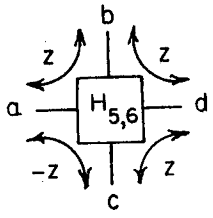
Figure 10B:
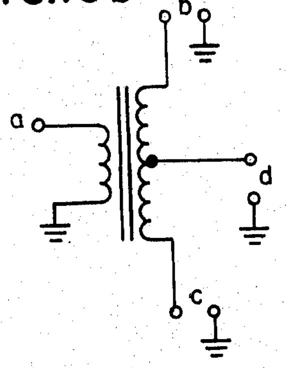
Figure 11:
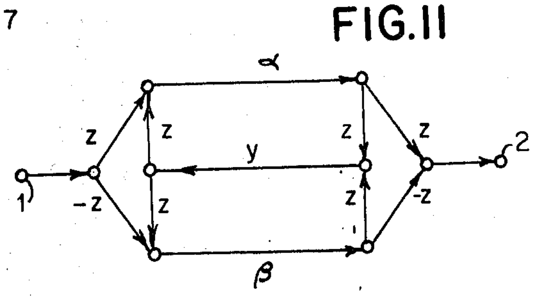
Figure 12:
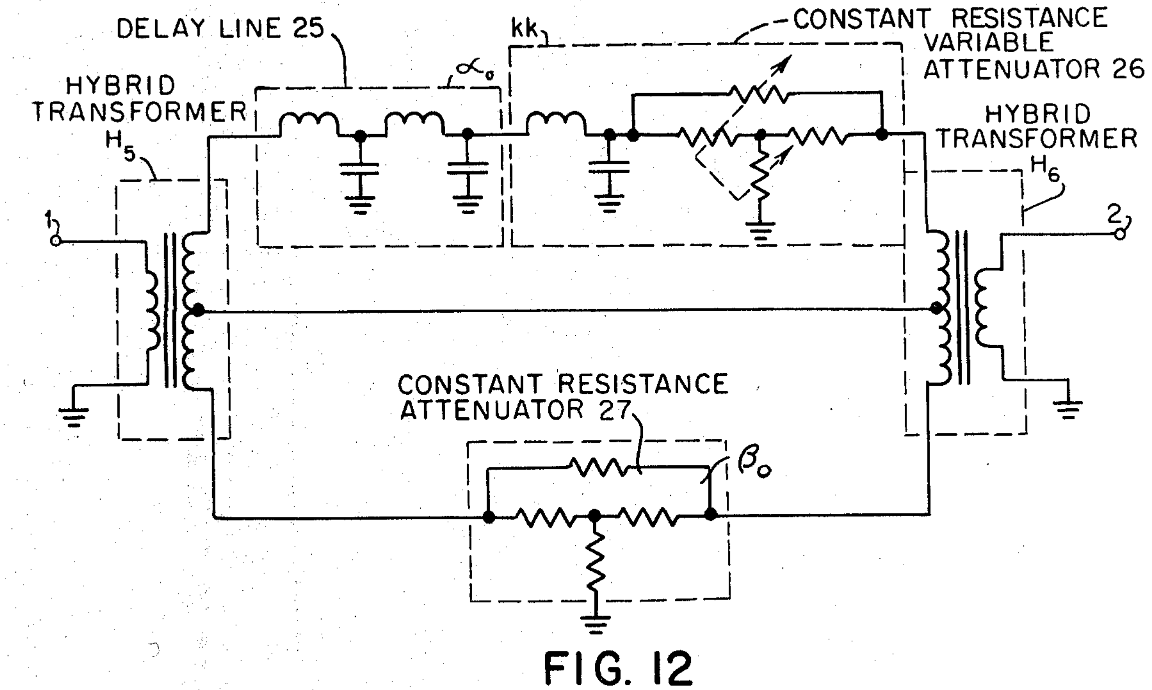
Figure 13:
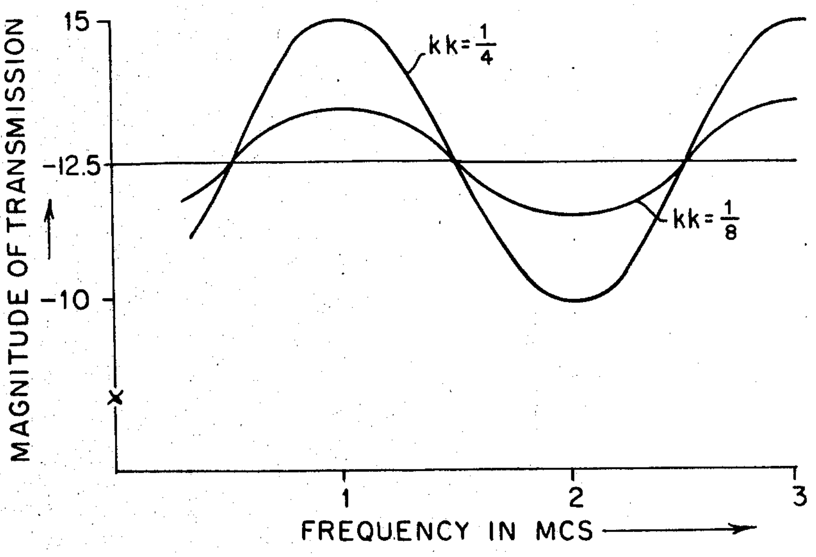
Figure 14:
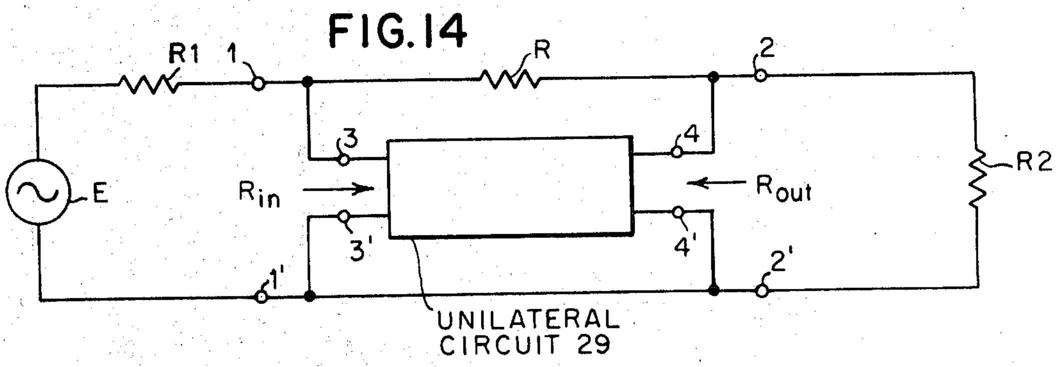
Figure 15:
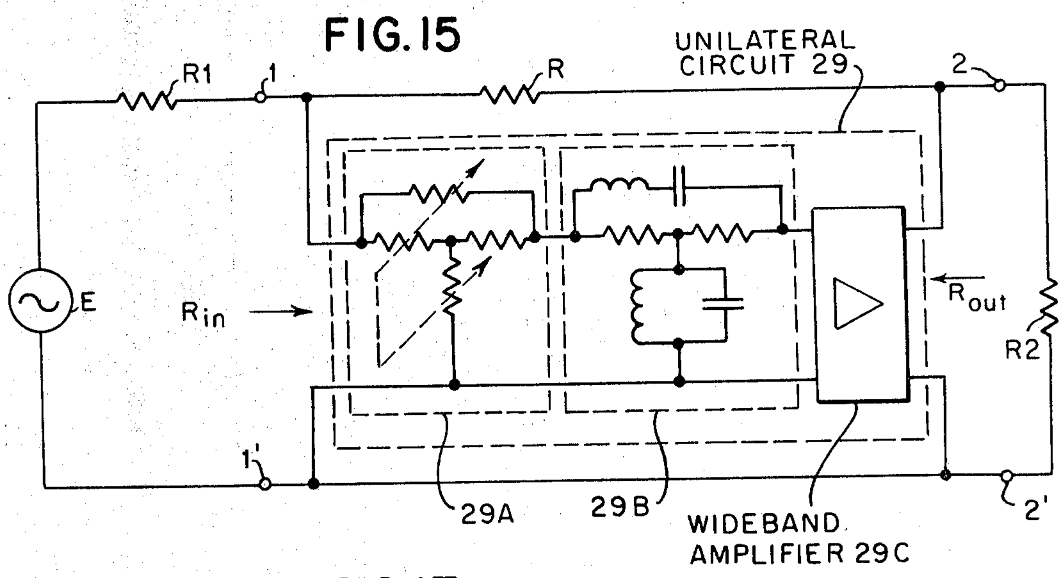
Figure 17:
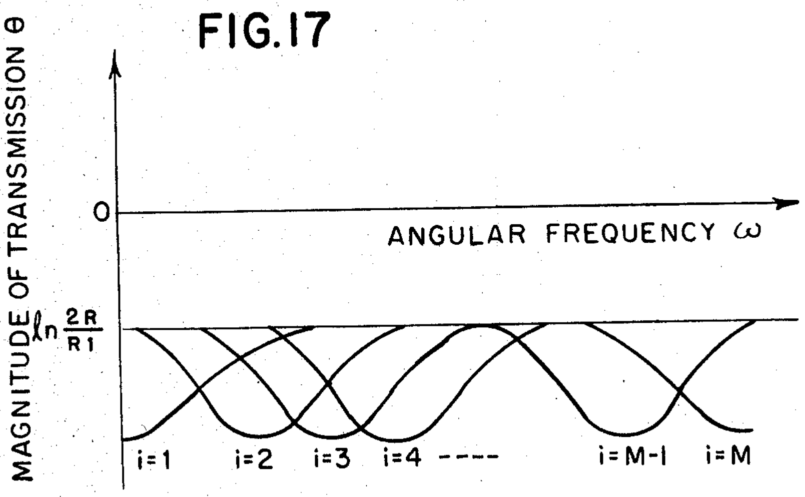
Figure 16:
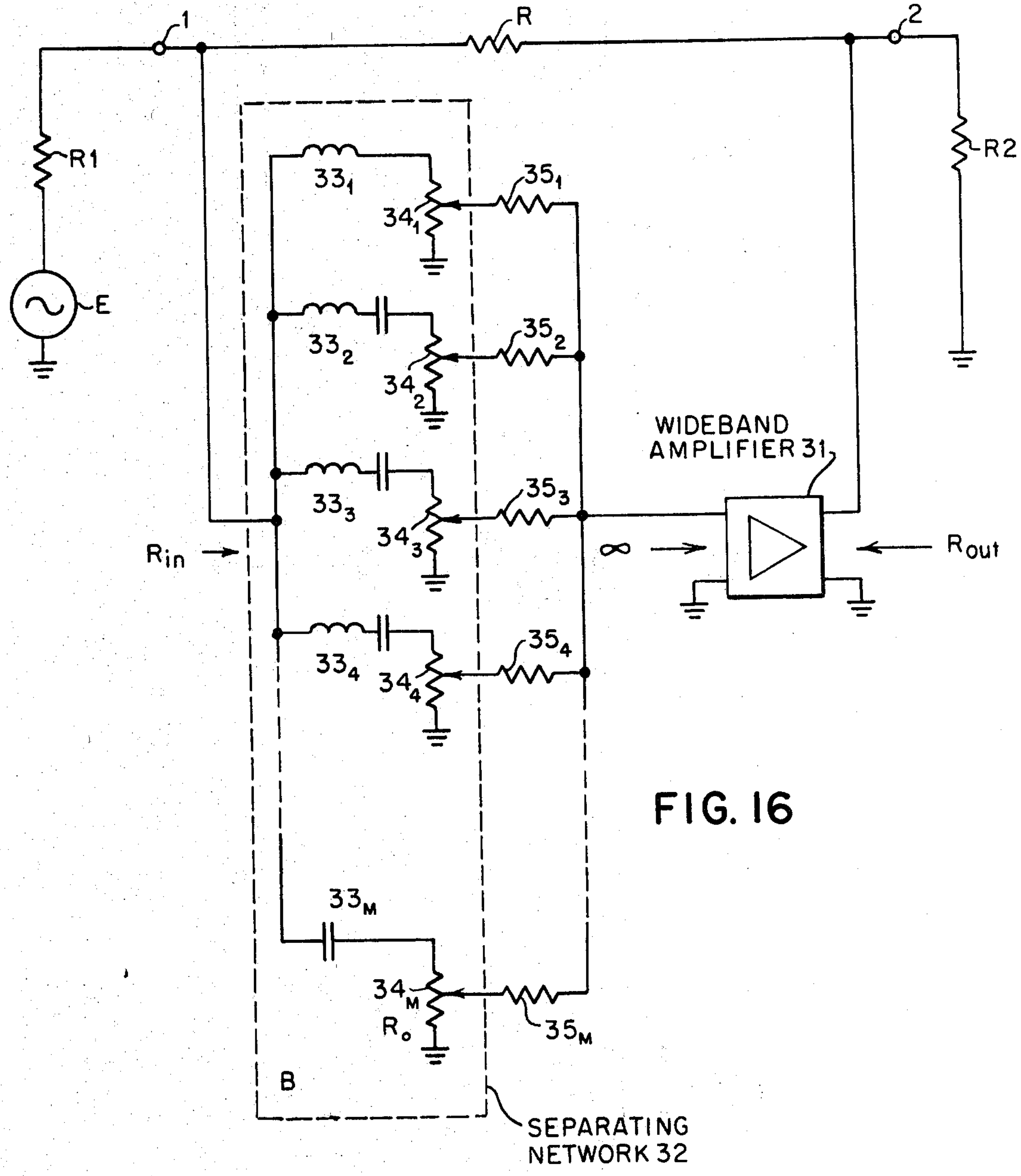

FIGS. 8*a* and 8*b* are graphical presentations of the transmission characteristic of the composite variable equalizer of FIG. 6;

FIG. 9 is a block diagram of another embodiment of the variable equalizer of the present invention;

FIGS. 10*a* and 10*b* are diagrams illustrating the principle of operation of hybrid transformers utilized in the variable equalizer of the present invention;

FIG. 11 is a signal flow diagram for the variable equalizer of FIG. 9;

FIG. 12 is a circuit diagram of the variable equalizer of FIG. 9;

FIG. 13 is a graphical presentation of the transmission characteristic of the variable equalizer of FIG. 12;

FIG. 14 is a block diagram of another embodiment of the variable equalizer of the present invention;

FIG. 15 is a circuit diagram of the variable equalizer of FIG. 14;

FIG. 16 is a circuit diagram of still another embodiment of the variable equalizer of the present invention; and FIG. 17 is a graphical presentation of the frequency characteristic of the variable equalizer of FIG. 16.

In the figures, the same components are identified by the same reference numerals.

Figure 1:
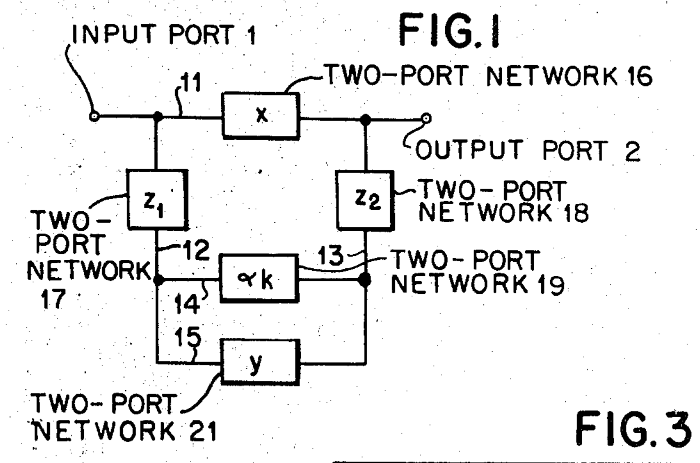
FIG. 1 is a block diagram of an embodiment of the variable equalizer of the present invention.
Figure 2:
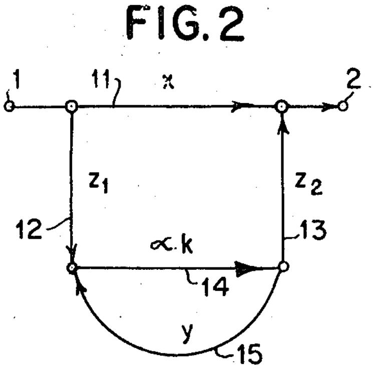
FIG. 2 is a signal flow diagram for the variable equalizer of FIG. 1.

In FIG. 1, the transfer coefficients of the respective branches 11, 12, 13, 14 and 15 of the variable equalizer are indicated by $x$, $z_1$, $z_2$, $\alpha k$ and $y$. Each of the five branches 11, 12, 13, 14 and 15 of the variable equalizer of FIG. 1 comprises a two-part network. The five branches are interconnected in a manner whereby the signal flow diagram of the transfer coefficient between the input port 1 and the output port 2 is that shown in FIG. 2. The two-port network 16 connected in the branch 11 and having a transfer coefficient $x$ provides the main transmission path between the input port 1 and the output port 2 and the two-port networks 17, 18, 19 and 21 connected in the branches 12, 13, 14 and 15, respectively, and having transfer coefficients $z_1$, $z_2$, $\alpha k$ and $y$, respectively, provide the four auxiliary transmission paths from said input port to said output port.

In the aforedescribed condition, the transfer coefficient $S_{21}$ between the input port 1 and the output port 2 is defined as $$S_{21}=x\left[\frac{1+\alpha k\left(\frac{z_1 z_2}{x}-y\right)}{1-\alpha ky}\right] \qquad (1)$$

The transfer coefficient is influenced by the relationship $$z_1 z_2=2xy \qquad (2)$$

The combination of Equations 1 and 2 produces a definition of the transfer coefficient $S_{21}$ as follows:

$$S_{21}=x\left[\frac{1+\alpha ky}{1-\alpha ky}\right] \qquad (3)$$

The magnitude or extent $\theta$ of the transmission or transfer between the input port 1 and the output port 2 is then $$\theta=l_n\left[(x)\frac{1+\alpha ky}{1-\alpha ky}\right]=l_n x+2\left[\alpha ky+\left(\frac{\alpha ky}{3}\right)^3+\left(\frac{\alpha ky}{5}\right)^5+\cdots\right] \div l_n x+2\alpha ky \qquad (4)$$

wherein $$\left(\frac{\alpha ky}{3}\right)^3\ll 1 \text{ and } \left(\frac{\alpha ky}{5}\right)^5\ll 1$$

If a variable having no relation to the frequency is selected as the transfer coefficient $k$ or $y$ and such variable is varied, the frequency characteristic of the variation of the magnitude or extent $\theta$ of transmission between the input port 1 and the output port 2 is $\alpha$ and the extent of such variation becomes proportional to $ky$. As a result, the variable equalizer of FIG. 1 operates with extremely high precision. The two-port networks of the five branches of the variable equalizer of FIG. 1 may be either unilateral or bilateral. Any necessary amplifiers may be included in the circuit of FIG. 1.

Figure 3:
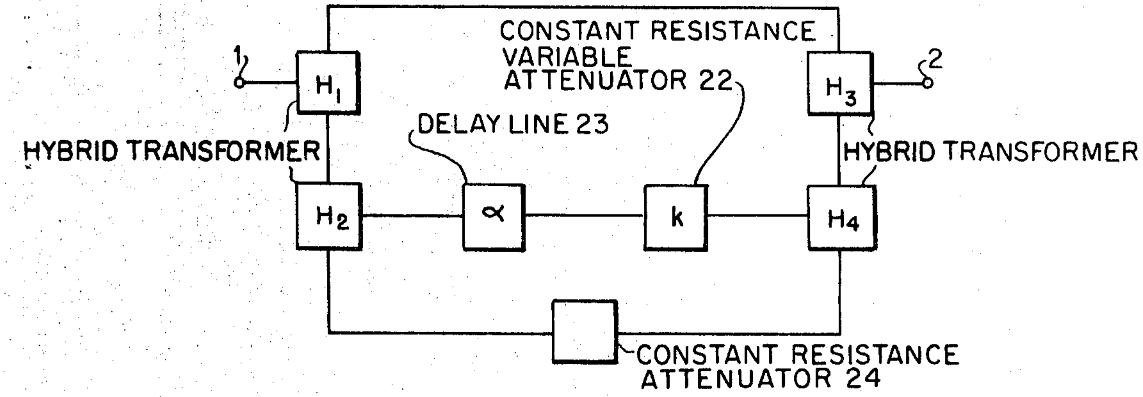
FIG. 3 is a block diagram of an embodiment of the variable equalizer of the present invention which functions as a cosine equalizer.
Figure 4:
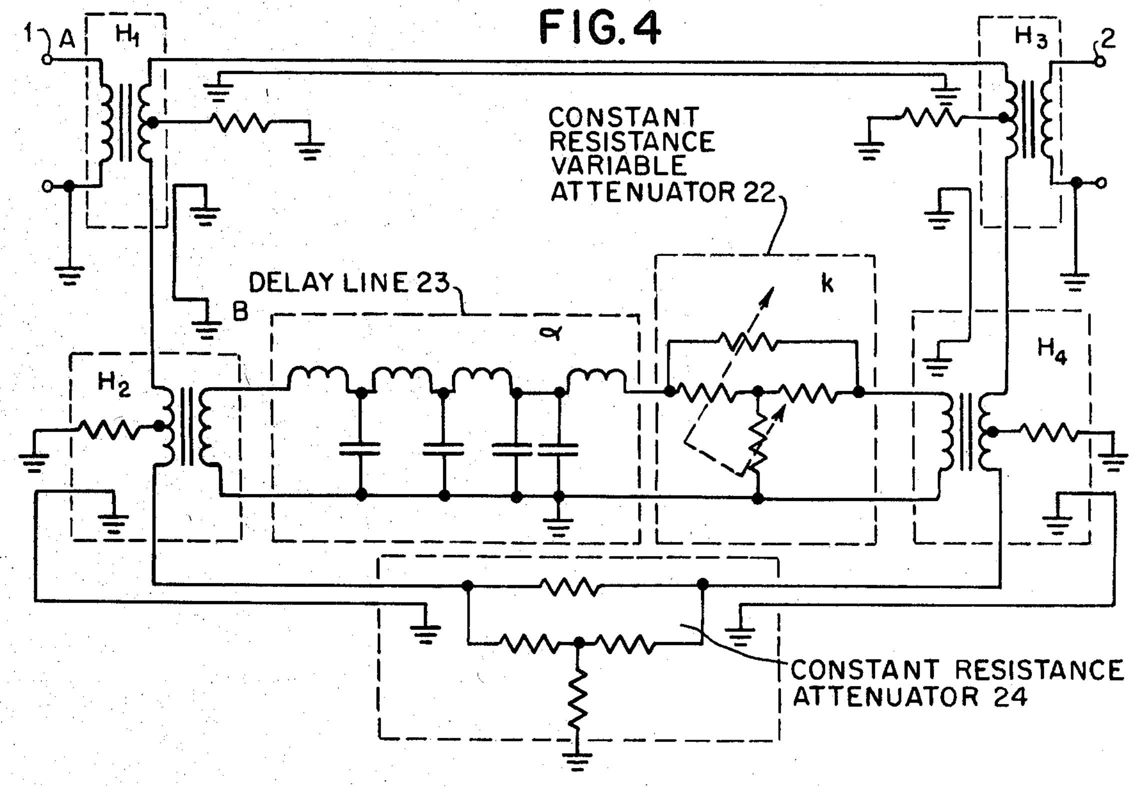
FIG. 4 is a circuit diagram of the cosine equalizer of FIG. 3.

The embodiment of FIGS. 3 and 4 functions as a cosine equalizer. In each of FIGS. 3 and 4, a hybrid transformer H comprises the two-port network of each of the branches $z_1$, $z_2$, $x$ and $y$ (FIG. 1). Thus, hybrid transformers $H_1$, $H_2$, $H_3$ and $H_4$ are connected in the various branches of the circuit. Each of the hybrid transformers H has an attenuation characteristic of 3 db in each direction. The transfer coefficient $x$ of the two-terminal network $H_1$ is thus equal to ½, the transfer coefficient $z_1$ of the network $H_2$ is equal to ½ , the transfer coefficient $z_2$ of the network $H_3$ is ½ and the transfer coefficient $y$ of the network $H_4$ is ¼.

Figure 5:
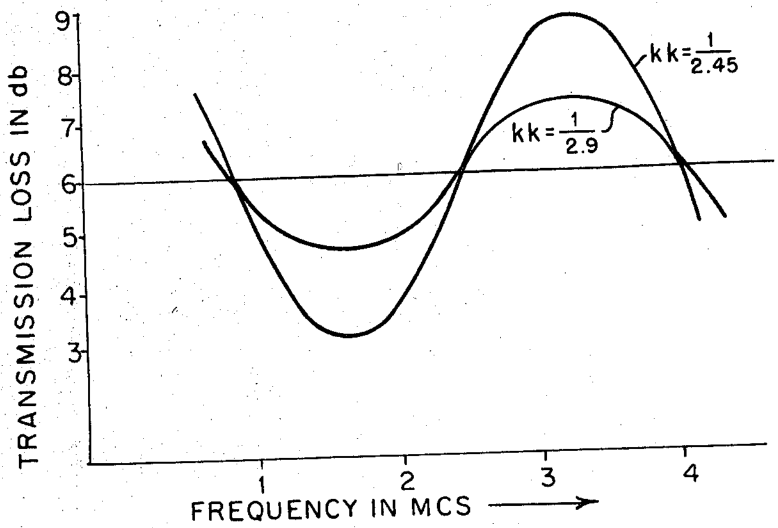
FIG. 5 is a graphical presentation of the transmission characteristic of the cosine equalizer of FIG. 3.

The frequency characteristic $\alpha$ is defined as $$\alpha=e^{j\frac{2\pi f}{f_0}}$$

wherein $f_0$=2.4 megacycles per second or megahertz. A variable equalizer having a proportional constant $kk$, as shown in FIG. 5, is thus provided by the embodiment of FIGS. 3 and 4. In FIG. 5, the abscissa represents the frequency in megacycles per second and the ordinate represents the transmission loss in db. A constant resistance variable attenuator 22 has a transfer coefficient $k$ and is connected in series circuit with a delay line 23 having a transfer coefficient $\alpha$, between the hybrid transformers $H_2$ and $H_4$ in FIG. 4. The delay line 23 has a plurality of inductors and capacitors. A constant resistance attenuator 24, having attenuation of 6 db, is connected between the hybrid transformers $H_2$ and $H_4$ in parallel with the series circuit 22, 23.

In another embodiment of the variable equalizer of the present invention, which functions as a composite variable equalizer, the magnitude or extent of operation and transmission $\theta$ of electrical signals from the input port 1 to the output port 2, as shown in FIG. 6, is $$\theta=\theta_0+\sum_{i=1}^{M}\alpha_i k_i \qquad (5)$$

wherein $\theta_0$ is a predetermined magnitude or extent of transmission, $\alpha_i$ is a function of the angular frequency $\omega$, which determines the form of attenuation and the phase characteristic, $k_i$ is a coefficient having no relation to the frequency, so that $\alpha_i$ may be compressed or expanded without changing the form of the function by adjusting $k_i$, and M is the number of independent variable characteristics or the number of types of $\alpha_i k_i$.

The composite variable equalizer of FIG. 6 has loops which correspond to a plurailty of independent variable characteristics and utilizes separating networks. The variable characteristics are determined by the unilateral transfer coefficients of the loops. The unilateral transfer coefficients are also coincident with the reverse direction in a passive circuit. The proportional variation of the magnitude or extent of transmission, involving the compression or expansion of $\alpha_i$, is provided by varying the real constant coefficient of the transfer coefficient, which real constant coefficient is the gain or loss in transmission. Furthermore, the characteristic indicated by Equation 5 may be provided in sum total by connecting the plurality of loops.

In FIG. 6, a plurality of hybrid transformers $H_1$, $H_2$, $H_3$ and $H_4$, similar to those utilized in the embodiment of FIGS. 3 and 4, are connected in the various branches, as in FIGS 3. and 4. The input signal is supplied to the composite variable equalizer of FIG. 6 via the input port 1 and the output signal is derived from the output port 2. A resistance attenuator AT$x$ which has a transfer coefficient $x$ is connected between the hybrid transformers $H_1$ and $H_3$. An amplifier $\mu$ is connected in the input of the hybrid transformer $H_4$. A plurality of reactance filters $SF_1$, $SF_2$ . . . $SF_M$ are connected between the hybrid transformer $H_2$ and the input to the amplifier $\mu$. An impedance compensating circuit CN is connected to the plurality of reactance filters $SF_1$ to $SF_M$. Each of a plurality of voltage dividers $R_{v1}$ to $R_{vM}$ is connected between the output of a corresponding one of the reactance filters $SF_1$ to $SF_M$ and the input of the amplifier $\mu$. Each of the voltage dividers $R_{v1}$ to $R_{vM}$ has a resistance value which varies the gain or loss of the shunts and which provides the port impedance of the separating network comprising the reactance filters $SF_1$ to $SF_M$. Each of a plurality of coupling resistors $R_{01}$ to $R_{0M}$ is connected between a corresponding one of the voltage dividers $R_{v1}$ to $R_{vM}$ and the input of the amplifier $\mu$.

In the composite variable equalizer of FIG. 6, the reactance filter $SF_1$ to $SF_M$ nearly satisfy the required conditions for operating as the constant resistance separating networks within the required frequency band. The reactance filters $SF_1$ to $SF_M$ are coupled to the amplifier $\mu$ via the coupling resistors $R_{01}$ to $R_{0M}$ which have resistance values $R_{01}$ to $R_{0M}$ sufficiently larger than the port impedance $R_{v1}$ to $R_{vM}$ of the voltage dividers $R_{v1}$ to $R_{vM}$ so that it may be assumed that there is no interreaction between said reactance filters. Thus, the impedance, viewed from the point A in FIG. 6, to which the inputs of the reactance filters $SF_1$ to $SF_M$ are commonly connected in parallel, may be made a constant or nearly constant resistance within the required frequency band. For this reason, electrical signals are hardly reflected at the point A.

Figure 7:
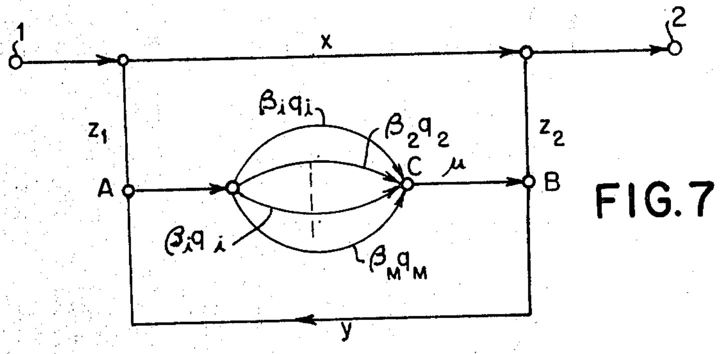
FIG. 7 is a signal flow diagram for the composite variable equalizer of FIG. 6.

The basis for the expression of the composite variable characteristics, wherein the magnitude or extent of transmission from the input port 1 to the output port 2 is Equation 5, is explained in the signal flow diagram of FIG. 7. The signal flow diagram of FIG. 7 discloses the transfer coefficients of the branch routes. In FIG. 7, the main transmission route from the input port 1 to the output port 2 has a transfer coefficient $x$. The route from the input port 1 to the point A has a transfer coefficient $z_1$. An auxiliary route fed back from the point B to the point A via the branch route from the hybrid transformer $H_4$ to the hybrid transformer $H_2$ has a transfer coefficient $y$. A route from the point A to the point B through a loop $SF_i$ of the separating network has a transfer coefficient of $\beta_i q_i$.

The transfer coefficient $S_{21}$ from the input port 1 to the output port 2 in the embodiment of FIG. 6 is expressed as $$S_{21}=x+z_1z_2\left[\frac{\sum_{i=1}^{M}\beta_i q_i \mu}{1-\sum_{i=1}^{M}\beta_i q_i \mu y}\right]=x\left[\frac{1+\left(\frac{z_1z_2-xy}{x}\right)\sum_{i=1}^{M}\beta_i q_i \mu}{1-y\mu\sum_{i=1}^{M}\beta_i q_i}\right] \quad (6)$$

When Equation 2, which is $z_1z_2=2xy$, is combined with Equation 6, the resultant equation is $$S_{21}=x\left[\frac{1+y\mu\sum_{i=1}^{M}\beta_i q_i}{1-y\mu\sum_{i=1}^{M}\beta_i q_i}\right] \quad (7)$$

The magnitude or extent of transmission is then defined as $$\theta=l_n\left[(x)\frac{1+y\mu\sum_{i=1}^{M}\beta_i q_i}{1-y\mu\sum_{i=1}^{M}\beta_i q_i}\right]=l_n x+2\left[y\mu\sum_{i=1}^{M}\beta_i q_i+\frac{1}{3}\left(y\mu\sum_{i=1}^{M}\beta_i q_i\right)^3+\frac{1}{5}\left(y\mu\sum_{i=1}^{M}\beta_i q_i\right)^5+\cdots\right]\doteqdot l_n x+\sum_{i=1}^{M}2\beta_i y\mu q_i \quad (8)$$

wherein $$\frac{1}{3}\left(y\mu\sum_{i=1}^{M}\beta_i q_i\right)^3\ll 1 \text{ and } \frac{1}{5}\left(y\mu\sum_{i=1}^{M}\beta_i q_i\right)^5\ll 1$$

The magnitude or extent of transmission $\theta$ provided by Equation 8 compares with the magnitude or extent of transmission $\theta$ provided by Equation 5 as follows:

$$\theta_0\leftrightarrow l_n x \qquad \alpha_i\leftrightarrow\beta_i \qquad k_i\leftrightarrow 2y\mu q_i \quad (9)$$

The foregoing indicates that the composite variable equalizer circuit of FIG. 6 provides the signal shown in FIG. 7 and therefore functions as a composite variable equalizer. That is, in comprising the variable circuit in the composite variable equalizer of FIG. 6 a wave divider is utilized and the transfer coefficients of the loops of the wave divider are provided with the required frequency-amplitude characteristics, so that the real coefficient which is the gain or the loss in each loop, is varied and the variable characteristics may be adjusted proportionally.

The circuit arrangement of FIG. 6 functions as a composite variable equalizer when each of the hybrid transformers $H_1$, $H_2$, $H_3$ and $H_4$ has a loss of 3 db and the attenuator $AT_X$ has a loss of 6 db. The transfer coefficients $x$, $z_1$, $z_2$ and $y$ of FIG. 7 may then have the following magnitudes.

$$x=1/4,\ z_1=z_2=y=1/2$$

The composite variable equalizer of FIG. 6 then has the characteristics shown in FIGS. 8*a* and 8*b*. FIG. 8*a* shows the characteristics of the reactance filters $SF_1$ to $SF_m$. In FIG. 8*a*, the abscissa represents the logarithm of the frequency and the ordinate represents the loss in db. The broken line $m$ is approximately 3 db. FIG. 8*b* illustrates the frequency bandwidth of the variable equalizer. In FIG. 8*b*, the abscissa represents the logarithm of the frequency and the ordinate represents the fundamental loss in db. In FIG. 8*b*, $\theta_0$ is approximately 12 db.

As shown in FIGS. 8*a* and 8*b*, the reactance filters $SF_1$ to $SF_M$ have a simple bandpass characteristic wherein the adjacent voltage attenuation characteristics may be overlapped with each other at a loss of approximately 3 db (FIG. 8*a*) and the variable characteristic is then that shown in FIG. 8*b*. In FIG. 8*b*, $\theta_0$ indicates a reference line in a case in which there is no loop as aforedescribed, and the characteristic shown in the drawing may be provided by varying the resistance value of the variable coupling resistor $R_{01}$ to $R_{0M}$. Signal reflection at the point A of FIG. 6 may be reduced by connecting the impedance compensating circuit CN in parallel with the reactance filters $SF_1$ to $SF_M$, as shown in FIG. 6. The impedance compensating circuit CN comprises inductance, capacitance and resistance.

Although the variable equalizers of FIGS. 3 and 6 each utilize four hybrid transformers, the embodiment of FIG. 9 utilizes only two hybrid transformers. In FIG. 9, the hybrid transformers $H_5$ and $H_6$ and three two-port networks 25, 26 and 27 having the transfer coefficients $\alpha$, $y$ and $\beta$, respectively, are connected between the input port 1 and the output port 2.

FIGS. 10*a* and 10*b* illustrate the operation of each of the hybrid transformers $H_5$ and $H_6$ of the variable equalizer of FIG. 9. Transmission at right angles such as, for example, from the lead *a* to the lead *b* in FIG. 10*a*, may be accomplished with a transfer coefficient of $z$. Transmission linearly from the lead *a* to the lead *d* in FIG. 10*a* cannot be accomplished because the transfer coefficient in such case is zero. FIG. 10*b* is a circuit diagram of a hybrid transformer. The two-port networks 25, 26 and 27, connected between the hybrid transformers $H_5$ and $H_6$, are matched at the leads *b*, *d* and *c* of said hybrid transformers.

The signal flow diagram of FIG. 11 indicates the transmission from the input port 1 to the output port 2 of FIG. 9. As shown in FIG. 11, the transfer coefficient $S_{21}$ between the input port 1 and the output port 2 is defined as $$S_{21}=(\alpha+\beta)z^2+\frac{(\alpha-\beta)^2z^4y}{1-z^2(\alpha+\beta)y}=(z^2)\left(\frac{\beta}{1-z^2y\beta}\right)\left[\frac{1+\frac{1-4z^2y\beta}{\beta}(\alpha)}{1-\frac{z^2y}{1-z^2y\beta}(\alpha)}\right] \quad (10)$$

since $$\frac{1-4z^2y\beta}{\beta}=\frac{z^2y}{1-z^2y\beta} \qquad (11)$$

then $$y\beta=\frac{3-\sqrt{5}}{4z^2} \qquad (12)$$

so that a combination of Equations 10 and 12 provides the following definition of the transfer coefficient $S_{21}$:

$$S_{21}=\left[\frac{z^2\beta}{1+\sqrt{5}}\right]\left[\frac{1+\frac{\sqrt{5}-2}{\beta}(\alpha)}{1-\frac{\sqrt{5}-2}{\beta}(\alpha)}\right] \qquad (13)$$

The magnitude or extent of transmission $\theta$ in a circuit having a transfer coefficient expressed by Equation 13 is $$\theta=l_n\left[\frac{z^2\beta}{1+\sqrt{5}}\right]\left[\frac{1+\frac{\sqrt{5}-2}{\beta}(\alpha)}{1-\frac{\sqrt{5}-2}{\beta}(\alpha)}\right] \qquad (14)$$

When $$\frac{\sqrt{5}-2}{\beta}(\alpha)$$

is less than 1, $$l_n\left[\frac{1+\frac{\sqrt{5}-2}{\beta}(\alpha)}{1-\frac{\sqrt{5}-2}{\beta}(\alpha)}\right]$$

may be defined as $$2\sum_{i=1}^{\alpha}\frac{\left[\frac{\sqrt{5}-2}{\beta}(\alpha)\right]^{2_i-1}}{2_i-1}=(2)\frac{\sqrt{5}-2}{\beta}(\alpha) \qquad (15)$$

When Equations 14 and 15 are combined, the magnitude or extent of transmission $\theta$ is expressed as $$\theta=(l_n)\frac{z^2\beta}{1+\sqrt{5}}+\frac{2(\sqrt{5}-2)}{\beta}(\alpha)$$

When the transfer coefficient $z$ of the hybrid in Equation 16 has a constant magnitude and $\beta$ has a constant magnitude which satisfies Equation 12 and has no relation to the frequency, the magnitude or extent of transmission $\theta$ varies in an amount $\Delta\theta$ as follows:

$$\Delta\theta=\frac{2(\sqrt{5}-2)}{\beta}(\alpha) \qquad (17)$$

Equation 17 clearly indicates that $\Delta\theta$ is promotional to the transfer coefficient $\alpha$. Thus, if the transfer coefficient $\alpha$ is $$\alpha=\alpha_0 k \qquad (18)$$

and if $k$ has a magnitude or value which has no relation to the frequency, the variation in the magnitude of transmission $\Delta\theta$ is defined as $$\Delta\theta=\frac{2(\sqrt{5}-2)}{\beta}(\alpha_0 k) \qquad (19)$$

that is, a value equal to $k$ times a frequency characteristic of $2(\sqrt{5}-2)\alpha_0/\beta$, which is the rate of variation, is provided as the variation of the magnitude or extent of transmission $\Delta\theta$. The circuit of FIG. 9 functions as a variable equalizer.

The variable equalizer of the embodiment of FIG. 9 of our invention utilizes two hybrid transformers or two branch circuits equivalent to said hybrid transformers. The variable equalizer of FIG. 9 has a frequency characteristic equivalent to the transfer characteristic of the transmission line connected between the hybrid transformers and adjusts the amplitude of the transmission to the gain or loss of said transmission line.

FIG. 12 is a circuit diagram of the embodiment of FIG. 9. FIG. 13 discloses the transmission characteristic of the variable equalizer of FIGS. 9 and 12. In FIG. 12, each of the hybrid transformers $H_5$ and $H_6$ has a characteristic of 3 db. Thus, $z=1/\sqrt{2}$. The network 25 comprises a delay line having a delay of $\alpha_0$ which is approximately 0.5 microsecond. A constant resistance variable attenuator 26 having a transfer coefficient $kk$ is connected in series circuit with the delay line 25 between the hybrid transformer $H_5$ and the hybrid transformer $H_6$. The network 27 comprises a constant resistance attenuator having an attenuation or characteristic $\beta_0$ which is 8.3 db and is connected between the hybrid transformers $H_5$ and $H_6$ in parallel with the series circuit 25, 26.

In the variable equalizer of FIG. 12, the quantity or extent of transmission is $$\theta=\frac{(8.684)(4)(\sqrt{5}-2)(kk)}{0.382}\left[\frac{\cos 2\pi f}{f_0}(\alpha^\beta)\right] \qquad (20)$$

In FIG. 13, the abscissa represents the frequency in megacycles per second or megahertz and the ordinate represents the magnitude or extent of transmission in db. In FIG. 13, the higher amplitude curve is derived at an attenuation $kk$ of the constant resistance variable attenuator equal to ¼ and the lower amplitude curve is provided at an attenuation $kk$ equal to ⅛.

Although four hybrid transformers are utilized in the embodiment of FIGS. 3 and 4 and in the embodiment of FIG. 6, and although two hybrid transformers are utilized in the embodiment of FIGS. 9 and 12, no hybrid transformer is utilized in the embodiment of FIG. 14. A variable equalizer without a hybrid transformer utilizes a circuit having a transfer coefficient of the desired frequency characteristic, a circuit having a transfer coefficient which may be varied arbitrarily and a circuit with only unilateral transfer. The variable equalizer of such type provides a pure resistance R between the output port 2 and the input port 1 which is defined as $$R=\frac{\sqrt{(R_a+R_b)^2+4R_aR_b}-(R_a+R_b)}{2} \qquad (21)$$

wherein $$R_a=\frac{R_1R_{in}}{R_1+R_{in}}$$

and $$R_b=\frac{R_2R_{out}}{R_2+R_{out}}$$

$R_{in}$ is the input impedance, $R_{out}$ is the output impedance, $R_1$ is the power source impedance connected to the input port 1 of the variable equalizer and $R_2$ is the load impedance at the output port 2 of the variable equalizer. The magnitude or extent of transmission of the variable equalizer as a whole is adjusted to a constant specific frequency by variation of the magnitude of the transfer coefficient.

In FIG. 14, the variable equalizer is connected between a pair of input ports 1, 1' and a pair of output ports 2, 2'. A constant voltage source E is connected directly to the input port 1' and is connected through the power source impedance $R_1$ to the input port 1. The load impedance $R_2$ is connected between the output ports 2 and 2'. A unilateral circuit 29 transfers a signal only from a pair of ports 3, 3' to a pair of ports 4, 4'. The unilateral circuit 29 has a short-circuit transfer admittance $g(\omega)$ at an angular frequency $\omega$. The pure resistance represented by the resistor R is connected in a feedback shunt of the unilateral circuit 29 and permits the operation of the embodiment of FIG. 14 as desired.

The operative transfer coefficient of the two-port variable equalizer network of FIG. 14 is expressed as $$S=\left(\frac{2}{R_1}\right)\left[\frac{R_aR_b}{R+R_a+R_b}\right]\left[\frac{1+R_g(\omega)}{1-\frac{R_aR_b}{R+R_a+R_b}[g(\omega)]}\right] \quad (22)$$

wherein $$R_a=\frac{R_1R_{in}}{R_1+R_{in}}$$

and $$R_b=\frac{R_2R_{out}}{R_2+R_{out}}$$

If $$R=\frac{R_aR_b}{R+R_a+R_b} \quad (23)$$

or $$R=\frac{\sqrt{(R_a+R_b)^2+4R_aR_b}-(R_a+R_b)}{2} \quad (24)$$

is combined with Equation 22, the resultant expression is $$S=\left[\frac{2R}{R_1}\right]\left[\frac{1+R_g(\omega)}{1-R_g(\omega)}\right] \quad (25)$$

The magnitude or extent of transmission $\theta$ is then $$\theta=l_nS=(l_n)\frac{2R}{R_1}+(l_n)\frac{1+R_g(\omega)}{1-R_n(\omega)}$$

$$=(l_n)\frac{2R}{R_1}+2R_g(\omega)+\frac{2}{3}[R_g(\omega)]^3+\dots$$

$$=(l_n)\frac{2R}{R_1}+2R_g(\omega) \quad (26)$$

Equation 26 indicates that the magnitude or extent of transfer is proportional to $g(\omega)$, except for a constant magnitude of $$(l_n)\frac{2R}{R_1}$$

in a range in which the higher order terms may be neglected. Thus, if $g(\omega)$ is divided into a term having the desired frequency characteristic and a term having a magnitude or value which may be changed to an arbitrary constant, it is possible to adjust the magnitude or extent of transfer in proportion with the frequency characteristic of the term having the desired frequency characteristic by varying the term having a value which may be varied to an arbitrary constant and thereby provide variable equalizer operation.

In FIG. 15, which is a circuit diagram of FIG. 14, the unilateral circuit 29 comprises a circuit 29A having a transfer coefficient $k$ which may be arbitrarily adjusted. The unilateral circuit 29 also comprises a circuit 29B with a transfer coefficient $\alpha(\omega)$ which has a determined frequency characteristic and which is relative to the angular frequency $\omega$. The unilateral circuit 29 further comprises a wideband amplifier 29C which has no frequency characteristic and which has a short-circuit transfer admittance $g_0$.

If impedance matching is provided between the circuits 29A and 29B and between the circuits 29B and 29C, said circuits perform as the unilateral circuit 29 of FIG. 14 and the short-circuit transfer admittance thereof is expressed as $$g(\omega)=k\alpha(\omega)g_0 \quad (27)$$

Accordingly, if Equations 23 and 24 are combined with Equation 26, the magnitude or extent of transmission or transfer is defined as $$\theta=(l_n)\frac{2R}{R_1}+2Rk\alpha(\omega)g_0 \quad (28)$$

It is thus possible to vary the magnitude or extent of transmission or transfer $\theta$ in proportion with $\alpha(\omega)$ by varying $k$.

FIG. 16 discloses still another embodiment of the present invention which functions as a multivariable equalizer. The magnitude or extent of transmission or transfer of the embodiment of FIG. 16 is defined as $$\theta=\theta_0+\sum_{i=1}^{M}\alpha_ik_i \quad (29)$$

wherein M is the number of independent characteristics $\alpha_i$ which may be varied independently from each other or the number of parts of an independent characteristic $\alpha_i$.

FIG. 17 discloses the frequency characteristic of the magnitude or extent of transmission or transfer at the instants when the independent characteristics have a maximum amplitude. In FIG. 17, the abscissa represents the angular frequency $\omega$ and the ordinate represents the magnitude of transmission $\theta$. The curves presented are those ranging from $i=1$ through M.

A wideband amplifier 31 has an input impedance which is infinite, an output impedance $R_{out}$, a short-circuit transfer admittance $g_0$ and no frequency characteristic. A separating network 32 is connected between the input port 1 and the input of the amplifier 31, the output of said amplifier being connected to the output port 2. The separating network 32 has a nearly constant input resistance. The input impedance of the separating network 32 in $R_{in}$. The separating network 32 comprises a plurality of partial filters 33$_1$ to 33$_M$. The terminating resistor 34$_1$ to 34$_M$, respectively, of each of the partial filters 33$_1$ to 33$_M$ of the separating network 32 has a resistance value of $R_0$. The partial filters 33$_1$ to 33$_M$ of the separating network 32 are connected to the input of the amplifier 31 via a plurality of resistors 35$_1$ to 35$_M$, respectively, each having a resistance R'.

Each of the resistors 35$_1$ to 35$_M$ has a high resistance value, so that the combined resistances $R_1$ satisfy the condition $R_0 \ll R'$ and the resistors function as potentiometers for deriving voltages. When the voltage transfer coefficients of the partial filters are $\alpha_i(\omega)$ where $i=1, 2, 3, 4, \dots M-1, M$ and the position of the potentiometer is $k_i$, where $k_i$ is greater than zero but less than 1, the short-circuit transfer admittance between the input of the separating network 32 and the output of the wideband amplifier 31 is expressed as $$g(\omega)=(g_0)\sum_{i=1}^{M}\alpha_i\left(\frac{k_i}{M}\right)=\left(\frac{g_0}{M}\right)\sum_{i=1}^{M}\alpha_ik_i \quad (30)$$

The magnitude or extent of operative transmission or transfer of the entire multivariable equalizer circuit of FIG. 16 is expressed as $$l_nS=(l_n)\frac{2R}{R_1}+\left(\frac{2Rg_0}{M}\right)\sum_{i=1}^{M}\alpha_ik_i \quad (31)$$

and the attenuation in operation or transmission loss is expressed as $$-\theta=(-l_n)\frac{2R}{R_1}-\left(\frac{2Rg_0}{M}\right)\sum_{i=1}^{M}R_e(\alpha_i)k_i \text{ (Neper)} \quad (32)$$

wherein $R_e(\alpha_i)$ is the real part of $\alpha_i$.

The transmission characteristic shown in FIG. 17 are provided when $k_i=1$ and $i=1, 2, 3, \dots M-1, M$. If $k_i$ is so varied, the multivariable equalizer of the embodiment of FIG. 16 provides a magnitude of transmission or transfer which is varied by a frequency characteristic proportional to each value of $i$, as shown by the different curves in FIG. 17.

While the invention has been described by means of specific examples and in specific embodiments, we do not wish to be limited thereto, for obvious modifications will occur to those skilled in the art without departing from the spirit and scope of the invention.

We claim:

1. A variable equalizer having a variable frequency characteristic, said equalizer comprising
 an input port;
 an output port;
 a plurality of two-port networks connected between said input and output ports, a first of said networks connected between said input and output ports having a transfer coefficient $x$, a second of said networks having a transfer coefficient $z_1$, a third of said networks having a transfer coefficient $\alpha k$ of which $\alpha$ represents the proportional variation of the magnitude of transmission of an electrical signal from the input port to the output port and $k$ represents the magnitude of the characteristic of proportional variation, and a fourth of said networks having a transfer coefficient $z_2$, said second, third and fourth networks being connected in series circuit with each other and said series circuit being connected in parallel with said first network, a fifth of said networks being connected in a feedback loop having a transfer coefficient $y$ and being connected in parallel with said third network, and wherein $z_1z_2=2xy$.

2. A variable equalizer as claimed in claim 1, wherein said fourth network determines the frequency characteristic of said variable equalized.

3. A variable equalizer as claimed in claim 1, wherein each of said plurality of said networks comprises a hybrid transformer.

4. A variable equalizer as claimed in claim 1, wherein each of said plurality of said networks comprises a hybrid transformer and further comprising a separating network connected between adjacent ones of said hybrid transformers in said loop.

5. A variable equalizer as claimed in claim 1, further comprising a separating network connected in said loop.

6. A variable equalizer as claimed in claim 1, further comprising a separating network connected in said loop and having a nearly constant resistance in a determined bandwidth.

7. A variable equalizer as claimed in claim 1, wherein said variable equalizer provides between said output and input ports a pure resistance $$R=\frac{\sqrt{(R_a+R_b)^2+4R_aR_b}-(R_a+R_b)}{2}$$

wherein $$R_a=\frac{R_1R_{in}}{R_1+R_{in}},\ R_b=\frac{R_2R_{out}}{R_2+R_{out}}$$

$R_{in}$ is the input impedance, $R_{out}$ is the output impedance, $R_1$ is the power source impedance connected to said input impedance and $R_2$ is the load impedance at said output port, the magnitude of transmission being variable to a constant specific frequency in accordance with variation in the magnitude of the transfer coefficient of said variable equalizer.

References Cited

UNITED STATES PATENTS

| | | | |
|---|---|---|---|
| 1,947,621 | 2/1934 | Schreiber | 333—28X |
| 2,907,838 | 10/1959 | Ross | 333—28UX |
| 3,148,537 | 9/1964 | Berwin et al. | 333—28X |
| 3,324,419 | 6/1967 | Kuroda et al. | 333—11X |

PAUL L. GENSLER, Primary Examiner

U.S. Cl. X.R.

333—11